(12) United States Patent
Benkreira et al.

(10) Patent No.: US 11,720,870 B2
(45) Date of Patent: *Aug. 8, 2023

(54) SYSTEM FOR PROVIDING APPLICATIONS ON AN AUTOMATED TELLER MACHINE (ATM)

(71) Applicant: Capital One Services, LLC, McLean, VA (US)

(72) Inventors: Abdelkader M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,353

(22) Filed: Nov. 3, 2022

(65) Prior Publication Data
US 2023/0071064 A1 Mar. 9, 2023

Related U.S. Application Data

(63) Continuation of application No. 16/001,681, filed on Jun. 6, 2018, now Pat. No. 11,494,747.

(51) Int. Cl.
*G06Q 20/02* (2012.01)
*G06Q 20/10* (2012.01)
(Continued)

(52) U.S. Cl.
CPC ......... *G06Q 20/1085* (2013.01); *G06F 21/31* (2013.01); *G06Q 20/02* (2013.01);
(Continued)

(58) Field of Classification Search
None
See application file for complete search history.

(56) References Cited

U.S. PATENT DOCUMENTS 6,796,492 B1 9/2004 Gatto
7,110,981 B1 9/2006 Sidikman et al.
(Continued)

FOREIGN PATENT DOCUMENTS

KR 20070067300 A 6/2007

OTHER PUBLICATIONS

Gidophone, "Cell Phone Charging Kiosk", Retrieved from the Internet on May 4, 2018: http://gidophone.com/, pp. 1-2.

*Primary Examiner* — Narayanswamy Subramanian
(74) *Attorney, Agent, or Firm* — Greenberg Traurig, LLP

(57) ABSTRACT

Described is an Automated Teller Machine (ATM), and related systems (and methods), that allows for applications (or "Apps") to be accessed on the ATM. The system allows for a third-party application to be verified and installed on ATMs to provide users with additional services. The application may access peripherals of the ATM via an Application Programming Interface (API) provided as part of a Software Development Kit (SDK). Accordingly, the system may provide a secure mechanism for ATM providers to provide users with the benefits of accessing third-party applications. Moreover, these applications may leverage specialized ATM peripherals and provide functionality that may not otherwise be available on other types of devices.

8 Claims, 5 Drawing Sheets

(51) Int. Cl.
  *G06F 21/31* (2013.01)
  *G06Q 20/22* (2012.01)
  *H04L 67/306* (2022.01)
  *H04L 67/53* (2022.01)

(52) U.S. Cl.
  CPC ......... *G06Q 20/227* (2013.01); *H04L 67/306* (2013.01); *H04L 67/53* (2022.05)

(56) References Cited

U.S. PATENT DOCUMENTS

| | | |
|---|---|---|
| 7,421,410 B1 | 9/2008 | Schechtman et al. |
| 7,472,092 B2 | 12/2008 | Phelan |
| 7,519,653 B1 | 4/2009 | Coutts et al. |
| 8,606,632 B2 | 12/2013 | Libman |
| 8,738,435 B2 | 5/2014 | Libman |
| 8,745,153 B2 | 6/2014 | Gharabally et al. |
| 10,037,420 B1 | 7/2018 | Ibrahim et al. |
| 10,546,468 B2 | 1/2020 | Irudayam et al. |
| 11,080,669 B1 * | 8/2021 | Walker .................. G07F 9/009 |
| 11,395,093 B2 * | 7/2022 | Fraccaroli ............. H04W 4/021 |
| 2001/0002468 A1 | 5/2001 | Nel |
| 2003/0200180 A1 | 10/2003 | Phelan, III et al. |
| 2007/0084523 A1 | 4/2007 | McLean et al. |
| 2007/0124164 A1 | 5/2007 | Gary |
| 2008/0067239 A1 | 3/2008 | Barcelou |
| 2011/0099040 A1 | 4/2011 | Felt et al. |
| 2011/0137689 A1 | 6/2011 | Chua et al. |
| 2012/0129577 A1 | 5/2012 | Vaknin et al. |
| 2012/0262112 A1 | 10/2012 | Ross |
| 2014/0222671 A1 | 8/2014 | Elias |
| 2014/0331189 A1 | 11/2014 | Lee et al. |
| 2015/0039452 A1 | 2/2015 | Barve et al. |
| 2015/0095240 A1 | 4/2015 | Specogna et al. |
| 2016/0358139 A1 | 12/2016 | Keys et al. |
| 2017/0236101 A1 | 8/2017 | Irudayam et al. |
| 2017/0286958 A1 | 10/2017 | Herman |
| 2019/0005474 A1 | 1/2019 | Cady et al. |
| 2019/0066441 A1 | 2/2019 | LeStrange et al. |
| 2019/0073663 A1 | 3/2019 | Jamkhedkar et al. |
| 2019/0378101 A1 | 12/2019 | Benkreira et al. |
| 2020/0090166 A1 | 3/2020 | Tonini |

* cited by examiner

SYSTEM FOR PROVIDING APPLICATIONS ON AN AUTOMATED TELLER MACHINE (ATM)

TECHNICAL FIELD

This disclosure relates to an automated teller machine (ATM) that provides access to installed applications, and more particularly, access to applications provided by third-parties.

BACKGROUND

In general, an automated teller machine (ATM) is an electronic telecommunications device that enables customers of financial institutions to perform financial transactions, such as cash withdrawals, deposits, fund transfers, or account information inquiries, at all hours and without the need for direct interaction with bank staff. Accordingly, ATMs provide a convenient and accessible mechanism for providing services to a user. With the advent of online banking and the availability of portable devices (e.g., smartphones), customers are accustomed to a high degree of convenience including the ability to access various services from computerized devices. However, ATMs have traditionally been limited to performing specialized functions relating exclusively to banking services. Conventional ATMs are underutilized in light of their potential abilities and existing equipment, including components and peripherals (e.g., a camera) that are currently limited to banking-related usage. Accordingly, it would be desirable to utilize the potential abilities and functionality of ATMs for the benefit of bank customers and other users.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

Figure 1:
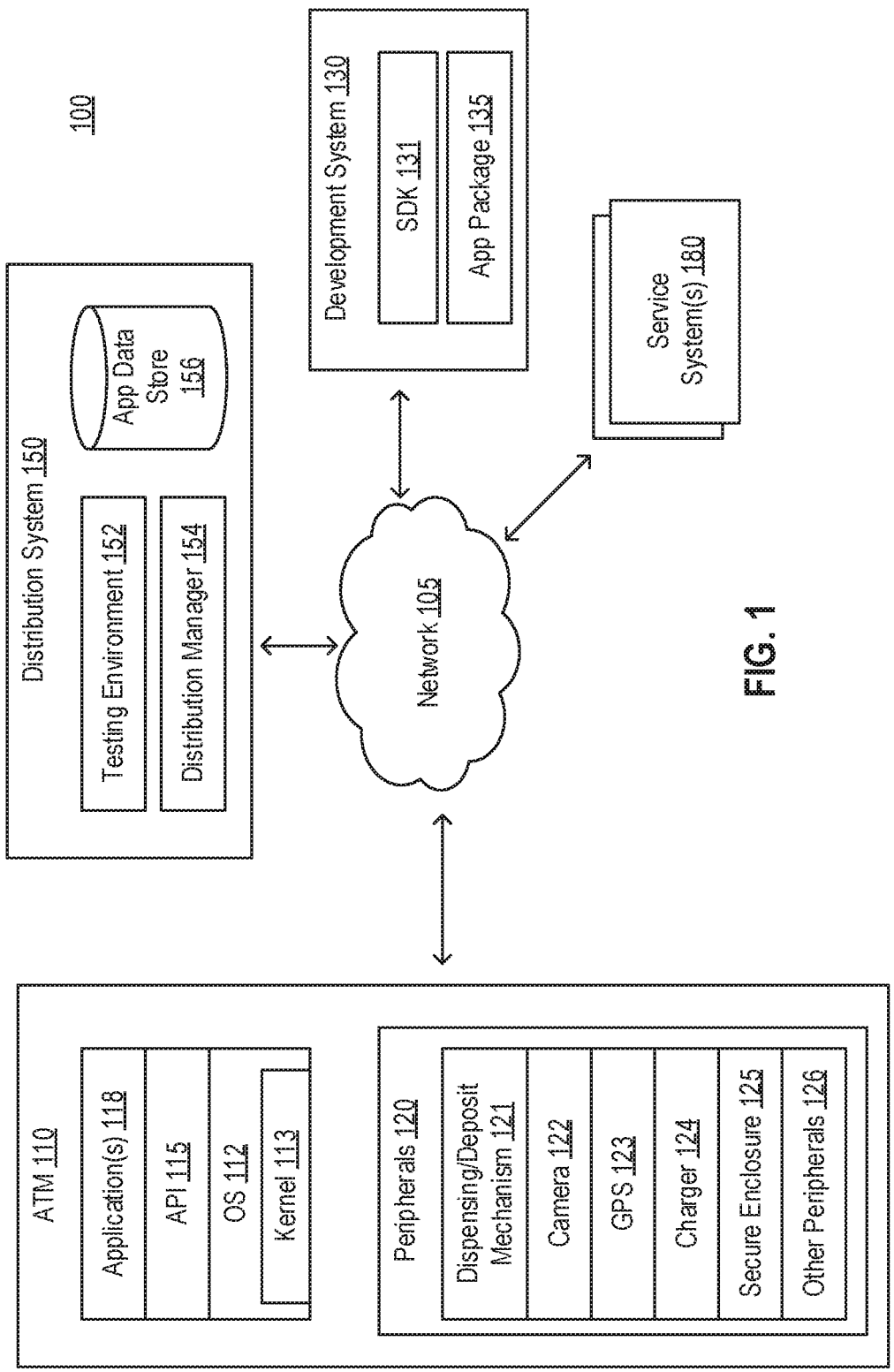
FIG. 1 is a block diagram illustrating an example of an operating environment for providing an application on an ATM according to one or more implementations of the disclosure.

Various implementations and aspects of the disclosures will be described with reference to details discussed below, and the accompanying drawings will illustrate the various implementations. The following description and drawings are illustrative of the disclosure and are not to be construed as limiting the disclosure. Numerous specific details are described to provide a thorough understanding of various implementations of the present disclosure. However, in certain instances, well-known or conventional details are not described in order to provide a concise discussion of implementations of the present disclosure.

Reference in the specification to "one implementation" or "an implementation" or "some implementations," means that a particular feature, structure, or characteristic described in conjunction with the implementation can be included in at least one implementation of the disclosure. The appearances of the phrase "implementation" in various places in the specification do not necessarily all refer to the same implementation.

In some implementations, described is a system (and method) for providing applications (or "Apps") on an Automated Teller Machine (ATM). The system may allow for the verification and distribution of third-party applications to be installed on ATMs associated with a financial entity to provide users with additional services. For example, upon authenticating a user, the ATM interface may provide the user with the option to launch one or more applications (e.g., third-party applications) allowing the user to interact with a service associated with the application. The application may operate or access one or more peripheral components of the ATM such as a camera, cash deposit mechanism, Global Positioning System (GPS) component, or other components to provide additional functionality. Access to such peripherals and information may be provided via an Application Programming Interface (API) for the ATM that may be part of a Software Development Kit (SDK) provided by a financial entity (e.g., financial institution associated with the ATM). For example, due to the relatively sensitive nature of information available to an ATM, the API provides the financial entity with the ability to ensure the application (e.g., including those developed by third-parties) interacts with certain components or financial information in an authorized and secure manner (e.g., without being able to obtain or access sensitive banking information or banking customer's personal information). Accordingly, the system described in some implementations of the disclosure provides a secure mechanism for allowing a financial institution to provide users with the benefits of accessing third-party applications. Moreover, in some implementations, the third-party application may leverage specialized ATM peripherals to provide features that may not otherwise be available to other types of devices.

In one aspect of the disclosure, described is a system (e.g., ATM) that may provide a user with the ability to access an application on the ATM. For example, as described, upon authenticating a user, the ATM interface may provide the user with the option to launch an application that may provide additional functionality by allowing the ATM to share information with a remote third-party system or service. In some implementations, the application may access peripherals of the ATM via an API. The system may also implement various sandboxing techniques to create a secure environment from which the application may operate on the ATM. By having a secure environment, the third-party application may share data with a third-party system or service that may be remote from the ATM without endangering personal or banking information. Accordingly, in one aspect of the disclosure, the system may enable a financial entity to allow third-party applications to be installed on an ATM and interact with a remote third-party service.

In another aspect of the disclosure, described is a system (e.g., distribution system) that may verify and distribute an application submitted by a third-party developer to be installed on an ATM. In some implementations, the system may act as a centralized storage (e.g., "App Store") that may initiate installation (and updates) of various applications onto an ATM. The system may perform a verification and/or testing process to ensure that the application operates in a suitable and authorized manner when installed on the ATM. More specifically, the system may verify various components and functionality of the application. For example, the system may verify that functionality related to the application accessing peripherals of the ATM is performed in an appropriate manner, e.g., so as not to damage or comprise the security of the peripherals. In addition, the system may verify that the application shares or accesses information, which may be shared with a remote third-party system, in a secure manner. Accordingly, the system may provide third-party developers with the opportunity to develop applications that may be installed on ATMs. Accordingly, the system may provide ATM providers, such as a financial entity, with the ability to offer users access to novel additional services beyond those previously provided by a conventional ATM.

As described, the application may provide additional functionality to an ATM by accessing the ATM's resources, information, or peripherals via an API.

In one implementation, an application may utilize location information provided by the ATM. For example, an application may interact with or access a transportation service (e.g., rideshare or taxi service) from the ATM. For instance, the application (e.g., rideshare app) may obtain location information from the ATM, via the API, and transmit that information to a rideshare service system (e.g., centralized dispatching system) along with a pick-up request. Upon obtaining such information from the ATM, the rideshare service system may dispatch a vehicle (e.g. taxi) to pick up the requesting user at the ATM location.

In another implementation, an application may utilize payment functions provided by the ATM. For example, an application (e.g., brokerage app) may access a user financial account or access (e.g. operate with) a cash dispensing/depositing peripheral, via the API, to obtain a payment from a user to purchase a financial security (e.g., stocks, bonds, options, mutual funds, etc.) from a brokerage service (e.g., online brokerage account). Similarly, an online retail application may access a user financial account or access (e.g. operate with) a cash dispensing/depositing peripheral, via the API, to obtain a payment from a user to purchase a good or services from an online retail service. Such payment functions may also be used for other applications that provide payment functions such as bill payments for utilities, cell phone carriers, memberships, etc.

In another implementation, an application may provide additional functionality by providing access to additional physical components provided by the ATM. For example, the ATM may provide physical or electrical access to a charging port (e.g., USB port, electrical outlet, other types of standardized or specialized ports/connectors, etc.) to allow a user to charge a device (e.g., smartphone). As another example, the ATM may be operatively coupled to a secure enclosure (e.g., safety deposit box) that may be accessed (e.g., unlocked) upon a user being authenticated by the ATM. Accordingly, the secure enclosure provides the ability for a user or a third-party to store items in secure manner and to control access to such items using authentication techniques provided by an ATM. In one implementation, the secure enclosure may be a temperature-controlled enclosure allowing for the storage of temperature sensitive items such as medications as part of a medication delivery service.

It should be noted that the applications and scenarios of additional functionality for an ATM described above are merely examples. Accordingly, it is to be understood that additional types of applications may provide additional functionality. For example, various applications relating to financial services, online retail services, transportation services, social media services, utility services, media services, gaming services, etc., may utilize the information and peripherals accessible via an API of an ATM as further described herein.

FIG. 1 is a block diagram illustrating an example of an operating environment for providing an application on an ATM according to one or more implementations of the disclosure. As shown, the operating environment 100 may include one or more systems including an ATM 110, an application distribution system 150 (or distribution/testing system), a development system 130, a service system 180 (or application/service system), and various other systems (not shown) such as banking/financial systems, which may interact via a network 105. The network 105 may be any type of wired or wireless network including a local area network (LAN), a wide area network (WAN), or a direct communication link, or other suitable connection.

The ATM 110 (also known as an Automated Banking Machine (ABM)) may include variations of a self-service banking machine or kiosk. For example, in one implementation, the ATM 110 may include a kiosk or device that may physically dispense or receive cash. To provide the functionality as further described herein, the ATM 110 may include an operating system 112, which may be any type of suitable operating system or platform including a specialized operating system. In addition, the operating system 112 may include a kernel 113. The kernel 113 may handle various lower-level functions of the operating system 112 such as process, memory, and peripheral management. The kernel 113 may operate in a secure environment. For example, the kernel 113 may be stored in a secure memory (e.g., not accessible by application 118), and operate within a kernel space, whereas the application 118 may operate within an application/user space. The API 115 (Application Programming Interface) may include a set of protocols including routines, data structures, object classes, libraries, variables, etc. that provide a defined method of communication between the application 118 and components of the ATM 110 including various peripherals 120. For example, an operation performed by the application 118 that requires communication with or access to one or more peripherals 120 of the ATM may only be available to the application 118 via the API 115. In another example, the application 118 may only be allowed to retrieve information related to a user account (e.g., financial information, payment information, etc.) via the API 115. In one implementation, the API 118 may be provided (e.g., developed) by a financial entity, which may be associated with the ATM 110 (e.g., an API may be provided by Bank A, which provides a network of Bank A ATMs).

The application 118 (or application software) may include program code (or a set of instructions) that performs various operations (or methods, functions, processes, etc.) as further described herein. For example, the application 118 may include any type of "app" such as a financial application, transportation application, social media application, utility application, media application, gaming application, etc. In one implementation, the application 118 may be provided and developed by a third-party. For example, a third-party may include an entity (e.g., company, product, etc.) that is different from the financial entity that may provide the ATM 110 or manage one or more user accounts (e.g., bank accounts) that are accessed by a user of the ATM 110. However, in one implementation, the application 118 may be provided by the financial entity itself and may interact with a third-party service or system (e.g., service system 180). In one implementation, the application 118 may be installed onto the operating system 112 of the ATM 110. In addition, in one implementation, the application 118 may reside (at least partially) on a remote system (e.g., service system 180) with the various components (e.g., front-end components) residing on the ATM 110. As further described herein, the application 118 may perform operations (or methods, functions, processes, etc.) that may require access to one or more peripherals 120.

The peripheral(s) 120, may include components (e.g., I/O components) of the ATM 110, some or all of which provide a user interface to the ATM 110. In one implementation, peripherals 120 may include ATM-specific peripherals, which are components that are typically not found on other types of devices (e.g., dispensing/deposit mechanism 121, card reader, etc.). The peripherals 120 may include a cash or check dispensing/deposit mechanism 121 (which may include a separate dispensing and deposit mechanism), a camera 122, a GPS component 123 (or GPS data store), a charging mechanism 124, and a secure enclosure 125. The secure enclosure 125 may include any type of container, compartment, box, locker, "mailbox" or "safety deposit box" type storage, etc., that may be suitable for the physical storage of various types of items. In one implementation, the secure enclosure 125 may part of a housing of the ATM. In another implementation, the secure enclosure 125 may be part of a separate housing (e.g., a separate housing, or wall), which may be at a remote location from the ATM. The secure enclosure 125 may be operatively coupled to the ATM. For example, a processor of the ATM may electronically lock or unlock the secure enclosure 125 for a particular user. In addition, the secure enclosure 125 may be temperature-controlled, humidity-controlled, etc., to provide an environment suitable to store various types of items. Such temperature and humidity control may be controlled from a remote system.

In addition, the peripherals 120 may also include various other peripherals 126 such as a biometric reader, touch screen that implements a graphical user interface, keypad, bank and credit card reader, USB key reader, receipt printer, and various other I/O (input/output) components.

When performing operations, the application 118 may interact with a service system 180 (or service/application system). The service system 180 may be any type of online system, service or application such as a server, website, network-accessible API, etc. that is associated with the application 118. For example, the service system 180 may be an online product or application which is remotely accessed by the application 118. For example, the service may include a financial service, transportation service, social media service, utility service, media service, gaming service, etc. In one implementation, the service system 180 may be remote from the ATM 110 (e.g., a separate system accessed via the network 105) and associated with the third-party providing the application 118. Accordingly, in one implementation, the ATM 110 may be associated (e.g., maintained by, provided by, owned by, etc.) with a financial entity and the service system 180 may be associated (e.g., maintained by, provided by, owned by, etc.) with the third-party. As described, the service provided on a service system 180 may have a corresponding application 118 (e.g., corresponding application available on an application store for various platforms).

Distribution system 150 (or application/distribution system) may provide a financial entity (or another type of entity) with the ability to verify and test applications that are intended to be installed on the ATM 110. For example, a third-party (or third-party developer) may submit an application package 135 intended to be installed on an ATM 110 as the application 118. In one implementation, the application package 135 submitted to the distribution system 150 may be signed and the distribution system 150 may verify such a signature. In one implementation, the third-party may submit the application package 135 from a development system 130, which may store, or have access to, the SDK 131 that may be provided by the financial entity for applications that run on the ATM 110. For example, the third-party may use the SDK 131 to create the application package 135. The distribution system 150 may also require third-party developers to update applications based on updates to the SDK 131 (e.g., make certain applications unavailable until updated). The distribution system 150 may include a testing environment 152 to perform a verification process on a submitted application package 135 (or application). The testing environment 152 may include an ATM 110 such as an internal ATM used by the financial entity for testing purposes, a simulated environment (e.g., virtual ATM), or a combination of both. For example, the testing environment 152 may include the operating system 112 and API 115, as well as components from the SDK 131 to perform the verification process. Upon a successful verification, the submitted application (application package 135) may be stored in an application data store 156 associated with the distribution system 150, which may be a local or remote storage. Accordingly, such application packages 135 may be distributed amongst a set of ATMs by the distribution manager 154 via network 105. In one implementation, the distribution manager 154 may distribute the application package 135 to all ATMs satisfying certain criteria (e.g., version, type, capabilities, geographic region, etc.).

It should be noted that each of the systems described in environment 100 may include one or more systems (e.g., servers). For example, a distribution server(s) and a testing server(s) may form the distribution system 150.

In a first aspect of the disclosure, described is a system that may provide a user with the ability to access an application on the ATM.

Figure 2:
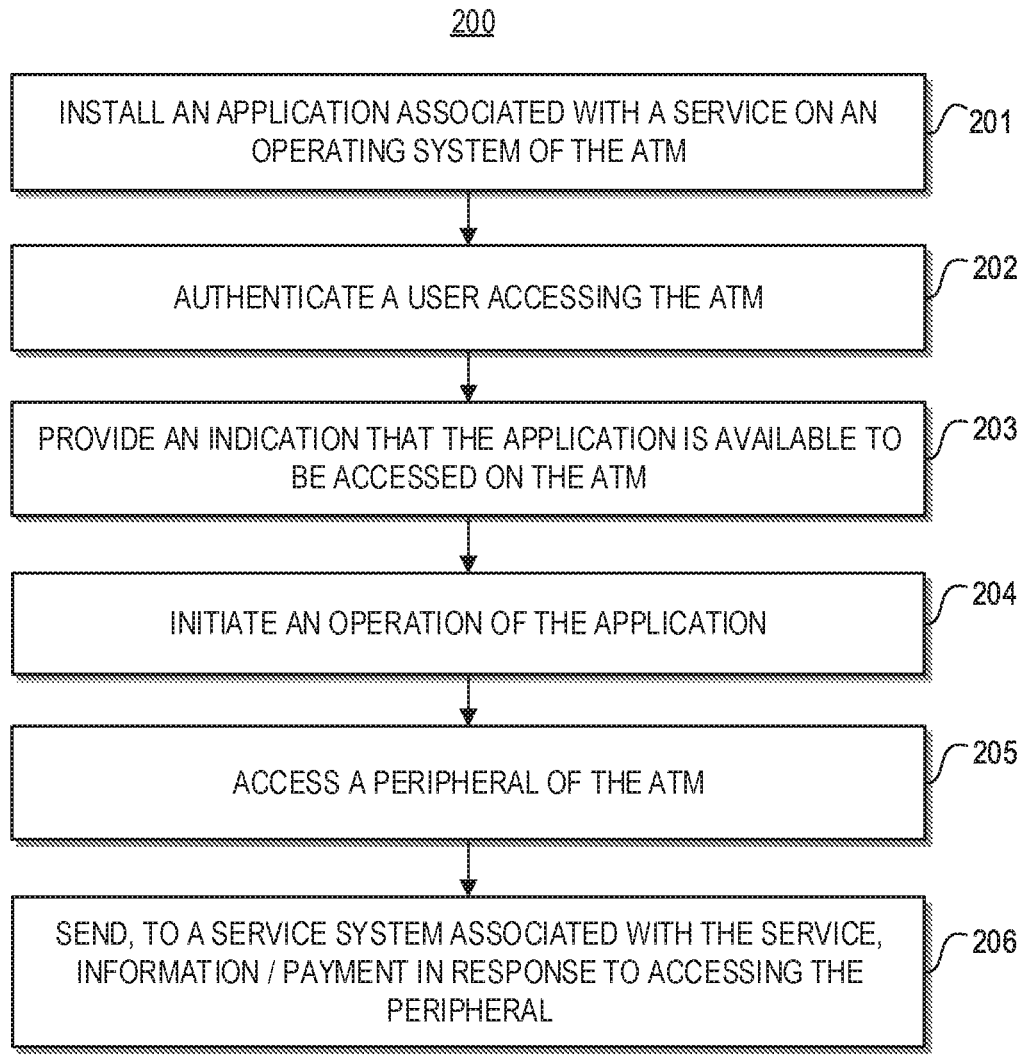
FIG. 2 is a process flow diagram illustrating an example of a process for providing an application on an ATM according to one or more implementations of the disclosure.

FIG. 2 is a process flow diagram illustrating an example of a process for providing an application on an ATM according to one or more implementations of the disclosure. Process 200 may use processing logic, which may include software, hardware, or a combination thereof. For example, process 200 may be performed by a system including one or more components described in operating environment 100 (e.g., ATM 110).

In 201, the system (e.g., ATM 110) may install an application (e.g., application 118) on an operating system (e.g., operating system 112) of the ATM. In one implementation, the application may be available to all users. However, the ATM may provide an application to a specific user or user accounts. For example, a particular user may wish to "install" a particular application, and accordingly, the particular application may be made available upon a user accessing the ATM. In some implementations, the application may have already been installed on the ATM, and accordingly, the ATM makes that application available (e.g., provides an option to launch the application on the user interface) to such users or user accounts. Alternatively, in one implementation, the ATM may also download (e.g. from the distribution system 150) and install a particular application in response to a user requesting access to a particular application on the ATM. For example, the particular application may be stored remotely (e.g. on app data store 156 of distribution system 150) and distributed (or downloaded) to the ATM in response to the user request.

In 202, the system may authenticate a user accessing the ATM 110 using any suitable technique. In one implementation, the authentication may include an ATM authentication (or ATM-specific authentication) mechanism. For example, the ATM authentication may include authenticating a user with various components that may be specific to an ATM such as a card reader, camera, near-field communication (NFC) with a mobile device, a generated code provided to mobile device, etc. For example, the user may swipe a card (e.g., debit card, credit card, bank card, etc.) and enter a PIN (personal identification number) as is known for ATMs. As another example, the user may be authenticated using the camera via facial recognition. In addition, in one implementation, the user may be authenticated based on a combination of facial recognition as well as OCR (Optical Character Recognition) from an identification (ID) card to verify a face of a user matches the face shown on the ID card (or to verify an identity of the user matches an identity to which access has been granted). As another example, the user may be authenticated by a code provided to a user account, and thus, the camera may verify an ID card corresponds to the name associated with the user account. For instance, a service may grant access to a particular user via a code (e.g., provided to a mobile device of the user) and may verify a biometric (e.g., face, fingerprint, voice, etc.) provided by the user to the ATM matches a biometric associated with a user account to which access was granted by a service. As another example, an NFC authentication may occur by verifying a mobile device in possession of the user is associated with a user account. Accordingly, in some implementations, the system may utilize ATM-specific components (e.g., hardware) to provide an ATM authentication not available to other types of devices (e.g., a mobile device, or a generic computer).

In one implementation, the ATM authentication may include authenticating a user to access a user account (e.g., financial account) to perform an ATM (or ATM-specific) financial transaction (e.g., a cash withdrawal, a check/cash deposit, a balance inquiry, etc.). Accordingly, in one implementation, the system may assume the user has been authorized to access various information or peripherals of the ATM based on the initial ATM authentication. In one implementation, the user may be authenticated to perform operations without a further authentication. For example, users of an ATM are typically only authorized for a particular session, and thus, only need to be authenticated once. Accordingly, in one implementation, the one or more peripherals may be accessed by the user based on the ATM authentication and without performing a subsequent authentication. In contrast, a mobile device often requires an initial authorization to access the device (e.g., passcode) and then a subsequent authentication for each application (e.g. login and password).

Accordingly, the system described herein can perform a more efficient ATM authentication due to the secure characteristics provided by an ATM.

As described, an authentication may include authenticating an account (or financial account) such as a bank account, credit card account, line of credit, cryptocurrency account, online payment currency, and various other types of accounts associated with a user. In some implementations, however, a user may access an application without necessarily having a financial account with a financial entity. For example, in some implementations, a user may access an application even when they do not own or possess a debit/credit card used to typically access an ATM. For example, the ATM may perform some form of verification in another manner (e.g., facial recognition using the ATM's camera), login information (e.g., username, and password), etc. For example, the authentication 202 may verify that the user has an account with a service associated with the application (e.g., an account with a ridesharing service), which is sufficient to access the application even if the user does not have an account associated with a financial institution (such as the financial institution associated with the ATM).

Figure 3B:
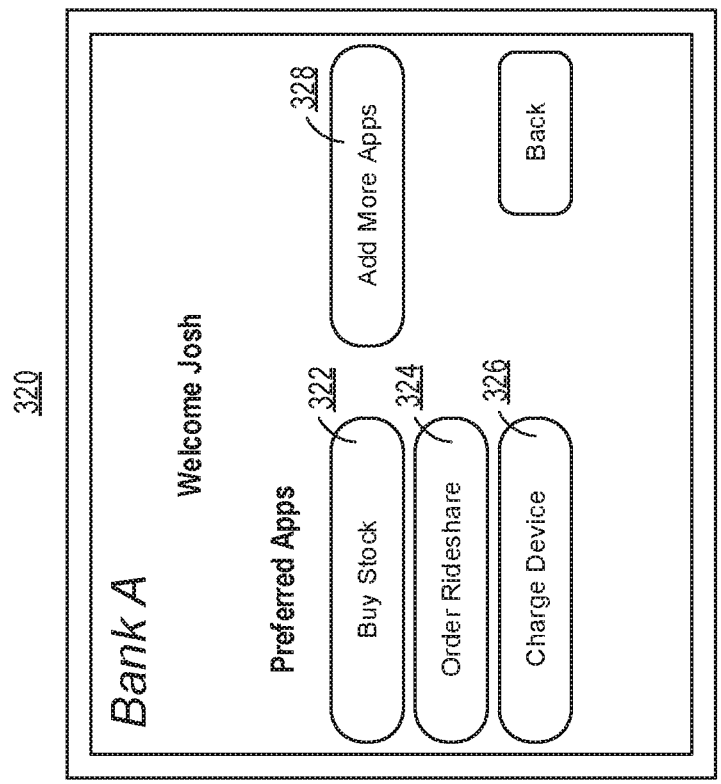
FIG. 3B is a diagram of an example interface indicating the particular applications that are available to be accessed on an ATM according to one or more implementations of the disclosure.
Figure 3A:
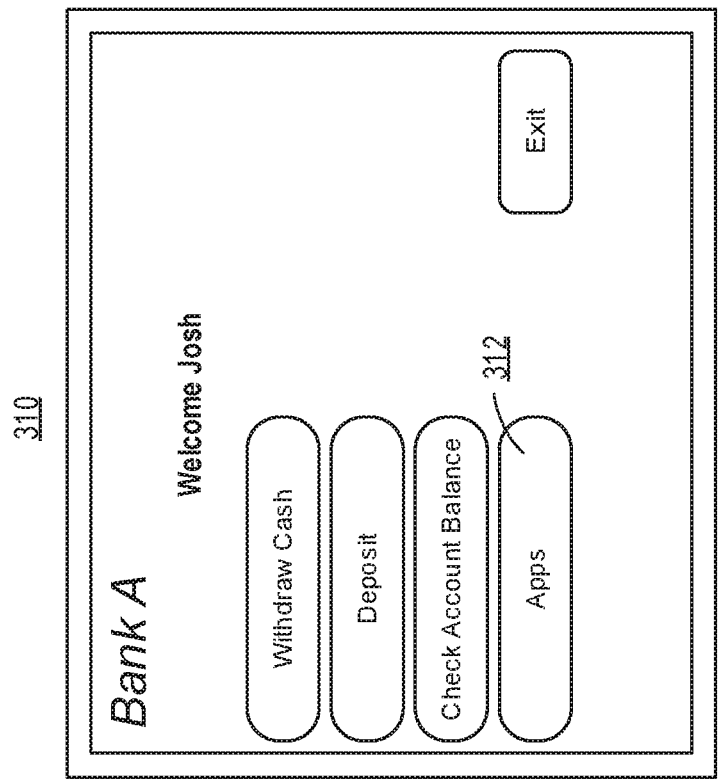
FIG. 3A is a diagram of an example interface indicating that applications are available to be accessed on an ATM according to one or more implementations of the disclosure.

In 203, the system may provide an indication that the application is available to be accessed on the ATM. For example, the system may provide such indication on a user interface of the ATM, such as a display screen. For example, FIG. 3A shows an example interface 310 indicating that applications are available to be accessed on an ATM. As shown in FIG. 3A, a menu item 312 (e.g. "Apps" button or selection option) indicates to the user that applications are available. For example, upon selection of menu item 312, a list of particular applications may be provided. For example, FIG. 3B shows an example interface 320 for indicating the particular applications that are available to be accessed on an ATM. As shown in FIG. 3B, menu items 322, 324, 326, which correspond to applications related to buying stock (e.g. brokerage service), ordering a rideshare service (e.g. rideshare/taxi service), and charging a device (e.g. from outlet provided by the ATM) respectively, provide an indication of particular applications that are available to be accessed on the ATM. In addition, menu item 328 ("Add More Apps" button or selection option) indicates that the user may add additional applications to the user's preferred list of applications as shown. For example, a user profile may be maintained indicating a list of preferred applications selected by the user. In addition, the displayed applications available to be accessed may vary based on capabilities of a particular ATM. For example, if the particular ATM does not have a particular peripheral (or another capability) required for an application, the application may be indicated as disabled or not displayed.

In one implementation, the system may perform an application initialization for a user. For example, the application initialization may include displaying a list of all available applications to the user from which the user may select preferred applications. If any of the preferred applications require additional information (e.g., login credentials for a service associated with the application), the user may be prompted to enter such information. Once the user enters all of the additional information (or if none of the preferred applications require additional information), the list of preferred applications may be saved as part of a user profile for the user. Accordingly, when the user next accesses the ATM (e.g., any ATM provided by the same financial entity that performed the initialization), the user may be presented with an option to open any of the preferred applications (e.g. as shown in FIG. 3B). In addition, in one implementation, the user profile information may be shared or associated with a bank card or user account, and accordingly, the list of preferred applications may be presented irrespective of the financial entity associated with the ATM. In addition, the application initialization, or a selection of preferred applications, may be performed from various devices in addition to the ATM. For example, the preferred applications may be configured from a mobile application (e.g., application installed on a smartphone), or a website, which are associated with a financial entity, or a particular application. In addition, a user may specify various settings or preferences for particular applications from such devices in addition to the ATM. For example, a user may configure various settings from a mobile application or website that control the operation of an application executing on the ATM.

Referring back to FIG. 2, in 204, the system may initiate one or more operations of the opened (or selected, launched, executing, etc.) application. For example, the system may initiate an operation in response to one or more inputs from the user, which may include the user interacting with application via the ATM 110 (e.g. providing touch input to initiate an operation), or interacting with the application via a remote system (e.g., mobile application, website, etc.). For example, operations may include various financial transactions available to an ATM such as determining an account balance, transfer of funds including a transfer to external or remote systems, initiating a purchase, depositing or dispensing cash, as well as other operations such as determining a location of the ATM (e.g., order a ridesharing service), locking or unlocking a secure enclosure, activating a charging port, performing a third-party authentication, capturing one or more images, and other operations. As described, operations of the application may include using or accessing an API (e.g., API 115) provided by the ATM 110. For example, the API may provide various types of information such as financial information (e.g., sufficient funds, types of accounts, credit limit, etc.) from the user's account(s). However, in some implementations, the API may restrict what information is accessible to the application. For example, a bank balance, personal information (e.g., address, Social Security Number, credit score, etc.), or potentially other sensitive information, may not be accessible to the application.

As described, the functionality provided by the ATM may include various payment and purchasing functionality. For example, access to the ATM may be based on a user having various types of accounts (e.g., bank account, credit card account, line of credit, cryptocurrency account, online payment currency, etc.) with the financial entity associated with the ATM, or with another financial entity. In one implementation, to user may initiate an operation to make a purchase from a third-party service using the application. For example, the application may correspond to an online retail service, brokerage service, media service, transportation service, or any other service that may allow the user to buy or purchase a product or service. Accordingly, the operation may involve accessing account information of the user and initiating a payment using a transfer of funds. In one implementation, the operation to make a purchase may include providing some form of payment to access one or more peripherals (e.g., location information, secure enclosure, charging port, etc.)

In some implementations, the application may take advantage of the specific payment functionality provided by an ATM. For example, a user may provide funds to a merchant directly using a cash deposit. Accordingly, in some implementations, a user may provide cash for a purchase without necessarily having an account (e.g., bank account or credit card), which is typically required when performing a payment online. Accordingly, such functionality provides the application accessed from an ATM with an advantage over an application that may be provided on another type of device (e.g. smartphone).

In one implementation, the application may allow a user to complete a purchase using multiple forms of payment. For example, the user may complete a purchase using a combination of an account (or financial account) and a cash deposit. In addition, funds may be transferred between methods. For example, excess funds provided by a user via a cash deposit for a purchase may be deposited to a user's bank account. As another example, the system may provide a mechanism to cover a shortfall from a particular payment method. For example, the application may determine a deposited cash amount is less than an amount required for a purchase. Accordingly, the application may prompt, on the user interface of the ATM, the user to select an account for providing a remaining portion of the amount required for the purchase. Accordingly, the application may access the account selected by the user to obtain the remaining portion of the amount required for the purchase. For instance, the system may receive an indication that a user wishes to make a purchase, and in response, initiate a transfer of funds to a remote system (e.g., service system 180) as payment. The system may determine a first payment amount using a first payment method is less than the purchase price, and in response, the system may provide a second payment amount (or remaining payment amount) using a different second payment method to fulfil the rest of the purchase. For example, as part of a payment operation, the user may select to provide payment from a bank account for a first payment amount, and in response to determining the first payment amount is less than the purchase price, the system may prompt the user to deposit cash for a second payment amount to fulfil the payment (or vice versa). In one implementation, the system may automatically prompt a user to deposit cash to cover a shortfall of the purchase price. As another example, the system may automatically (e.g., without an additional user input) transfer funds from an account to cover a shortfall of a cash deposit. Accordingly, the system may provide an efficient mechanism to provide a secondary form of payment that may be specific to an ATM, which is another feature that would not be available using an application provided on another type of device (e.g., smartphone).

As described, it should be noted that the system may provide such payment functionality within a secure environment by preventing the application from having direct access to information related to a financial account. In one implementation, the application may be provided within a sandbox (e.g., the application may not be able to access processes or memory outside of its sandbox).

As another example, in one implementation, the application may correspond to a service that requires a location of the ATM. For instance, the application may correspond to a ridesharing/taxi service, where the location is needed in order to pick up the user. Accordingly, the operations may involve accessing a location of the ATM.

As another example, in one implementation, the application may provide a mechanism for a user or a third-party to store items in a secure enclosure (e.g. secure enclosure 125) and to control access to such items using authentication techniques provided by the ATM. Accordingly, the operations may include controlling access to the secure enclosure to allow a particular user (e.g., depositor) to drop off an item to the secure enclosure and allow a particular user (e.g., receiver) to pick up the item from the secure enclosure. In one implementation, such a feature may be provided as one or more operations that are part of a process flow. For example, the system may authenticate a depositor (e.g., delivery person, courier, etc.) who does not necessarily require an account with the financial entity associated with the ATM. The depositor may be authenticated using any suitable method including techniques described herein. In one implementation, the depositor may be authenticated using a code generated by the application (or service associated with the application). For example, the code may be a QR code, barcode, alphanumeric code, etc. that is provided (e.g., shown to a camera, entered via a keypad, etc.) by the depositor to the ATM. In one implementation, the depositor may provide identification (ID) to the ATM (e.g., shown to a camera, swiped via a card reader, etc.) as well as provide the code for authentication. In response, the system may validate the code, which may be time sensitive (e.g., expires after a predefined period of time). After authenticating the depositor, the application (e.g., via an API) may unlock a particular secure enclosure, which may be specified by the application. The depositor may then place an item into the secure enclosure. The depositor may also provide identification information for the item (e.g., a code as described above) for tracking purposes. This identification information may then be provided to the application or remote system (e.g., service system). The secure enclosure may then be locked (e.g., automatically upon closing, or electronically by the application), and the item is then securely stored for a user (e.g., receiver) to access. Accordingly, a receiver may access the item upon an authentication. The receiver may be authenticated using any suitable method including methods described herein. For example, the user may be authenticated using a technique for accessing the ATM (e.g., bank card and PIN). The receiver may have an account associated with the financial entity providing the ATM, and thus, may be provided with use of a secure enclosure. However, in some implementations, the receiver does not require an account with a financial entity and the system may perform an authentication, for example, in a manner similar to that used for the depositor as described above (e.g., via a generated code). Once the receiver has been authorized, the application may unlock the particular secure enclosure to allow the receiver to obtain the item.

The secure enclosure may store any suitable types of items. For example, as described above, the secure enclosure may be temperature-controlled to create an environment suitable for storing medications. In one implementation, the medication may be provided using an application associated with a medication providing service (e.g., by a pharmacy, or government program). For example, the application (e.g., pharmacy app, delivery app, etc.) may work in conjunction with a pharmacy that fulfils a prescription and subsequently delivers the prescription to a nearest ATM.

For example, a user (e.g., patient) may obtain a prescription from a doctor, which forwards the prescription to a provider (e.g., pharmacy). The user may have an account with the provider that provides a medication delivery service. The provider may provide an application which may be installed on one or more ATMs, along with corresponding versions on a device associated with a user, and/or a delivery person. Accordingly, upon receiving the prescription, the service (e.g., via a service system/application) may determine an ATM location that is closest to the user (e.g., based on information of the user's account, ZIP code, etc.). The service may then coordinate the delivery of the medication to a particular ATM as described above. For example, the service may provide a generated code to an application installed on a device associated with the pharmacy delivery driver allowing the driver to be authenticated by the ATM to deposit the medication to a secure enclosure as described above. The service may then notify the user of the delivery of the medication and provide the location via an application installed on a device associated with the user. Accordingly, the user may then access the ATM and be authenticated using, for example, techniques as described herein. The user may then launch an application installed on the ATM that accesses the secure enclosure via an API to allow the user to obtain the deposited medication. The application may also initiate obtaining a payment via the cash deposit mechanism and/or a financial account associated with the user. For example, the user may provide payment for the medication (or a delivery fee), which is then forwarded from the ATM to the service. It should be noted that such a service would comply with various rules or regulations required to dispense/deliver medications in such a manner (e.g., related to privacy, medication storage, etc.).

Returning back to FIG. 2, in 205, the system may access one or more peripherals (e.g., peripherals 120) of the ATM. For example, access to a peripheral may be part of the application performing an operation (e.g., step, subroutine, etc.) as described in 204. In one implementation, the peripherals may include ATM-specific peripherals, which are components that are typically not found on other types of devices (e.g., dispensing/deposit mechanism 121, card reader, etc.). In one implementation, the peripherals 120 may include a dispensing/deposit mechanism 121, a camera 122, a GPS component 123 (or GPS data store), a charging mechanism 124, a secure enclosure 125, and various other peripherals 126 such as a biometric reader, touch screen, keypad, card reader, and various other I/O (input/output) components. As described, access to one or more peripherals may be provided via an API.

For example, as described above, as part of a purchasing operation, the application may access a cash deposit mechanism (e.g., dispensing/deposit mechanism 121) of the ATM allowing the user to deposit cash for the purchase. Accordingly, in one implementation, the user may provide cash as part of a third-party transaction, instead of or in addition to, submitting funds from a banking account. Accordingly, in one implementation, the user may provide a payment using a combination of cash and funds from one or more user accounts (e.g., bank account, credit card, line of credit, etc.).

As another example, as part of an ATM location identifying operation, the application may access a GPS component or a data store storing the GPS coordinates of the ATM. As yet another example, an application may provide access to physical components such as a charging port of the ATM that allows the user to charge a device. In one implementation, the ATM may provide the charging port access upon authenticating a user. For instance, the ATM may provide such service for a nominal fee or as a free benefit to users having a user account with the financial entity associated with the ATM.

As another example, the ATM may access a secure enclosure operatively coupled to the ATM. As described, the system may unlock the secure enclosure to allow the user to obtain or deposit one or more items in the secure enclosure.

In addition, as part of the functionality of the application, the application may share information with a service associated with the application. In one implementation, a service may include a platform accessible in an online environment (e.g., website, server, API, etc.). Accordingly, in 206, the system may send (e.g., provide, transmit, etc.) to a service or (service system 180) associated with the third-party service, a payment as part of a purchase initiated by the user from the application. Accordingly, the system may send a payment from the ATM as part of a process to complete the purchase.

In addition, in one implementation, the system may provide (e.g., send, share, transmit, etc.) to a service associated with the third-party service, information provided in response to accessing the peripheral. For example, the system may provide, to a service system, information such as the amount of cash deposited in the dispensing/deposit device 121, an image of the user from the camera 122, coordinates from a GPS device 123, identity information from a card reader, whether an item has been obtained or deposited into the secure enclosure, alphanumeric information entered by the user via a touch screen of the ATM 10, etc. Such information may be provided by the application or directly from the API.

In the context of a purchasing operation, the system may send a payment in various forms as provided by the ATM, or account associated with the user, to the service system. For example, as described above, the payment may be provided by a user depositing cash to the cash deposit mechanism. As an example of sending information, the system may send a confirmation of a sufficient amount of funds available to the user to complete a purchase initiated by the application. In one implementation, the confirmation of a sufficient amount of funds may be sent by the API, or obtained from the API by the application. For example, the API may include a call (or operation, or method) that receives a dollar amount (e.g. purchase price) and determines whether such a dollar amount is available to the user, for example, from a cash deposit, financial accounts, or combination thereof. For instance, the API may return a true/false value based on such a determination. Accordingly, the user is protected from a third-party application from knowing the values of one or more financial accounts. In other words, the API may restrict the application from accessing information of a banking account associated with the user.

In the context of ordering (or purchasing) a rideshare service, the system may send location information (e.g. coordinates) of the ATM, user (passenger) information, etc. In the context of using the secure enclosure, the system may send information including a confirmation a user has obtained or deposited one or more items in the secure enclosure, identification information for an item, identification information for the particular secure enclosure used to store an item, etc. As described, a user may initiate a purchase (e.g., via a cash deposit) that is provided to a service as part of an operation to access a peripheral.

As part of the interaction between the application and service, the service may also provide information to the application, which may be provided to the user through various I/O components such as the display of the ATM. For example, in the context of a purchase operation performed by the ATM, the application may receive, from the service system, a receipt (or confirmation). For example, such a receipt or confirmation may be displayed on the user interface, printed by the ATM via a receipt printer, or conveyed to the user in another manner. For example, in the context of ordering a ridesharing service, the application may provide a confirmation a vehicle has been dispatched.

Accordingly, the application may provide additional functionality to an ATM by accessing the ATM's resources, information, or peripherals via an API.

In a second aspect of the disclosure, described is a system that may verify and distribute an application submitted by a third-party developer to be installed on an ATM.

Figure 4:
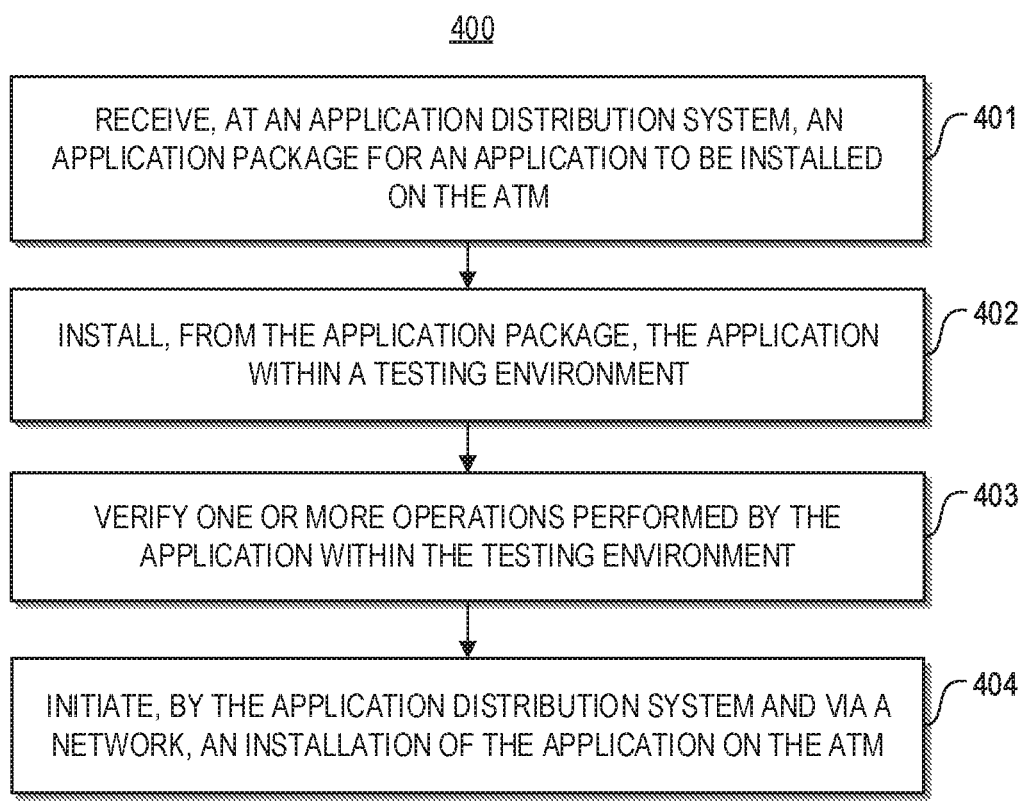
FIG. 4 is a process flow diagram illustrating an example of a process for verifying a submitted application to be installed on an ATM according to one or more implementations of the disclosure.

FIG. 4 is a process flow diagram illustrating an example process for verifying an application for an ATM according to one or more implementations of the disclosure. Process 400 may use processing logic, which may include software, hardware, or a combination thereof. For example, process 400 may be performed by a system including one or more components described in operating environment 100.

In 401, the system (e.g., distribution system 150) may receive an application package (e.g., application package 135) for an application (e.g., application 118) to be installed on the ATM (e.g., ATM 110). In one implementation, the application package may be provided by a system associated with a third-party service (e.g., development system 130). As described, the application may be associated with a third-party service and configured to access a peripheral (e.g., peripheral 120) of the ATM using an API (e.g., API 115).

In 402, the system may install the application within a testing environment (e.g., testing environment 152). For example, the system may install the application from the received application package. In one implementation, the testing environment may simulate an in-service ATM 110, and may include an operating system 112 and an API 115 used by the application. In one implementation, the testing environment may ensure that the application performs in a manner specified by the financial entity providing the SDK 131, and operates correctly and securely in the ATMs on which the applications may be installed.

In 403, the system may verify the correct, proper, and secure functioning of one or more operations performed by the application within the testing environment 152. For example, the operations may include any of the functions or operations that an application may perform as described above (e.g., in 204-205). For example, the operations may relate to accessing a cash deposit mechanism, obtaining location information, performing a payment operation, providing access to other physical peripheral components (e.g., charging port, secure enclosure, etc.), and any other operations that may be performed by the application. In one implementation, the operations to verify may be selected based on their interactions with the API. In addition, the testing environment may ensure various sandboxing techniques and secure memory mechanisms are fully adhered to. In one implementation, upon verification, the system may store such applications to be distributed amongst a set of ATMs.

In 404, the system may initiate, via the network, an installation of the verified application on a set of ATMs, such as the ATM 110, as described above. In addition, the system may provide various updates and new applications in a scheduled manner. Accordingly, the system allows for the secure distribution of such applications for the benefit of users.

One of ordinary skill will recognize that the components, processes, data, operations, and implementation details shown in FIGS. 1-4 are examples presented for conciseness and clarity of explanation. Other components, processes, implementation details, and variations may be used without departing from the principles of the disclosure, and these example are not intended to be limiting as many variations are possible. For example, the operations (or methods, processes, etc.) shown and described above are not necessarily performed in the order indicated and may be performed in parallel. It should also be understood that the methods may include more or fewer operations than are indicated. In some implementations, operations described herein as separate operations may be combined. Conversely, what may be described herein as a single operation may be implemented in multiple operations.

Figure 5:
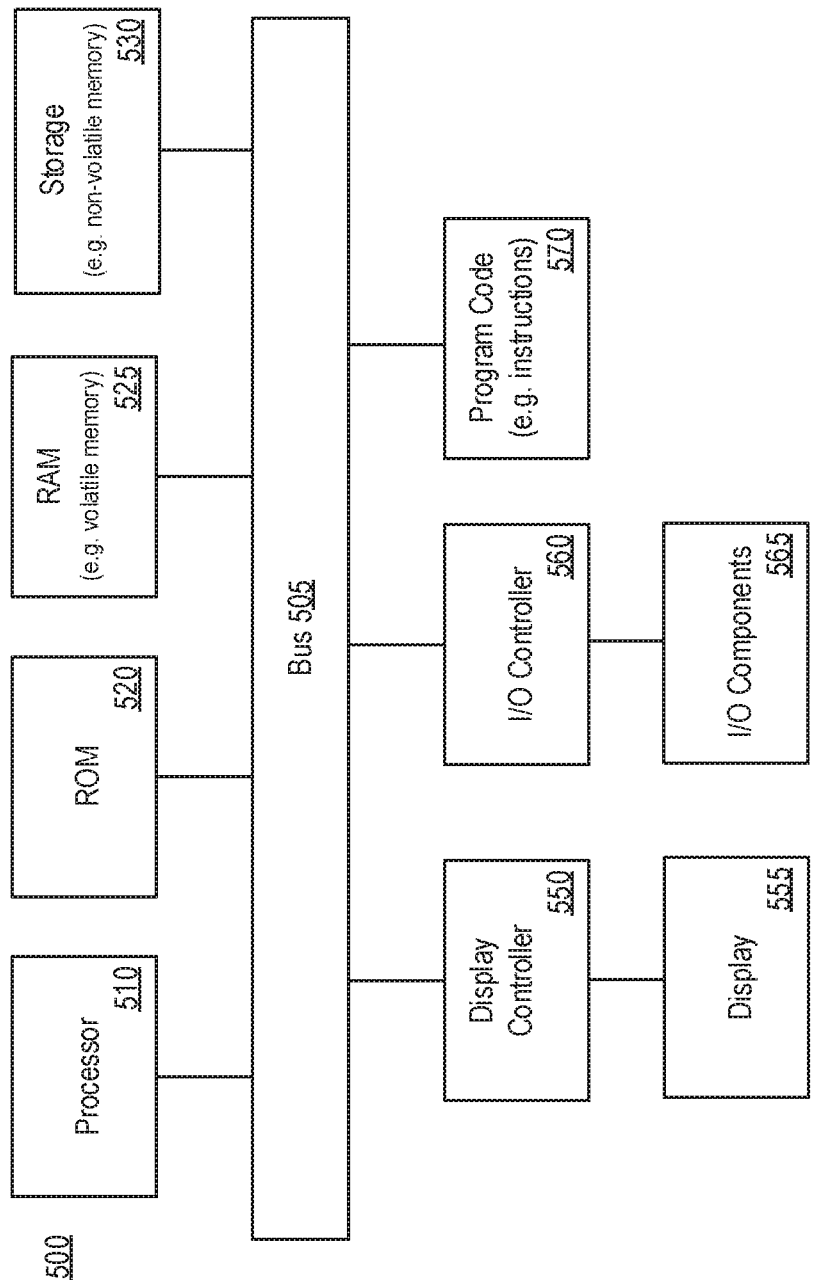
FIG. 5 is a block diagram illustrating an example of a computing system that may be used in conjunction with one or more implementations of the disclosure.

FIG. 5 shows a block diagram of an example of a computing system that may be used in conjunction with one or more implementations. For example, computing system 500 (or system, or server, or computing device, or device) may represent any of the devices or systems (e.g., ATM 110, distribution system 150, service system 180) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor 510 may retrieve stored instructions from one or more of the memories 520, 525, and 530 and execute the instructions to perform processes, operations, or methods described herein. These memories represent examples of a non-transitory computer-readable medium (or machine-readable medium, or storage) containing instructions which when executed by a processor (or system, or computing system), cause the processor to perform operations, processes, or methods described herein. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g., accessible via a network).

A display controller 550 may be coupled to the bus 505 in order to receive display data to be displayed on a display device 555, which can display any one of the user interface features or implementations described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 (or modules, instructions, components, subsystems, units, functions, or logic) may represent any of the instructions, operations, subsystems, or engines described above. Program code 570 may reside, completely or at least partially, within the memories described above (e.g., non-transitory computer-readable media), or within a processor during execution thereof by the computing system. In addition, program code 570 can be implemented as software, firmware, or functional circuitry within the computing system, or as combinations thereof.

Moreover, any of the disclosed implementations may be embodied in various types of hardware, software, firmware, and combinations thereof. For example, some techniques disclosed herein may be implemented, at least in part, by non-transitory computer-readable media that include program instructions, state information, etc., for performing various methods and operations described herein. Examples of program instructions include both machine code, such as produced by a compiler, and files containing higher-level or intermediate code that may be executed by a computing device such as a server or other data processing apparatus (or machine) using an interpreter.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other implementations of the invention will be apparent to those skilled in the art from consideration of the specification and practice of the invention disclosed herein. It is intended that the specification and examples be considered as examples only, with a true scope and spirit of the invention being indicated by the claims.

The invention claimed is:

1. A method comprising:
  receiving, by a processor of an automated teller machine (ATM), over a network from a service provider, a service application package of a service application associated with the service provider that provides a service associated with the service application, wherein the service provider is distinct from a provider of the ATM;
    wherein the service comprises at least one of:
      a rideshare-related service,
      a transportation-related service,
      a gaming-related service,
      an online media-related service,
      a home utility-related service,
      a rent-related service,
      a medical-related service, or
      a medicine-related service;
  instructing, by the processor of the ATM, to install on an operating system of the ATM, the service application using the service application package, the ATM including an application programming interface (API) and one or more peripherals accessible by the service application via the API;
    wherein the one or more peripherals including a cash deposit mechanism and at least one location system;
    wherein the least one location system comprises at least one of:
      data store or
      a satellite positioning system component,
    wherein the ATM is associated with an entity different from the service entity;
  receiving, by the processor, credentials for an ATM-associated entity account receiving, by the processor, an account authentication where the credentials match the ATM-associated entity account;
    wherein the account authentication enables the API to control the one or more peripherals;
    wherein the one or more peripherals are accessed by the user based on the account authentication and without performing a subsequent authentication;
  receiving, by the processor, an application authentication from the third-party service in response to the account authentication;
  providing, by the processor, on the user interface of the ATM, an indication that the third-party application is available to be accessed on the ATM based on the application authentication;
  receiving, by the processor, one or more inputs to the service application;
    wherein the one or more inputs are based on user selection in the service application;
  communicating, by the processor, the one or more inputs to the service;
  receiving, by the processor, an operation request from the service based on the one or more inputs;

wherein the operation request identifies an operation and is configured to utilize the API to control the one or more peripherals of the ATM using a predefined protocol;
wherein the operation comprises providing a location of the ATM;
accessing, by the service application and via the API, the at least one location system to obtain the location of the ATM;
wherein the API restricts the third-party application from accessing information of a financial account associated with the user during the deposit of cash;
controlling, by the processor, based on at least one instruction from the service and via the API, the cash deposit mechanism to receive a deposit of cash according to the operation;
sending, to a service system associated with the service, the location information;
receiving, from the service system, a confirmation that a physical service has been dispatched to the location of the ATM; and
displaying, on the user interface of the ATM, the confirmation.

2. The method of claim 1, wherein the satellite positioning system comprises a global positioning system (GPS).

3. The method of claim 1, further comprising:
determining, by the third-party application, a cash deposit amount of the deposit of cash is less than an amount required;
prompting, on the user interface of the ATM, the user to select an account for providing a remaining portion of an amount required in response to the cash deposit amount being less than the amount required; and
accessing, by the third-party application, the account selected by the user to obtain the remaining portion of the cash deposit amount.

4. The method of claim 1, further comprising:
receiving, from the third-party service, a receipt in response to the physical service being dispatched; and
displaying, on the user interface of the ATM, the receipt.

5. A system comprising:
an automated teller machine (ATM);
a non-transitory computer readable medium having software instructions stored thereon; and
at least one processor in communication with the non-transitory computer readable medium, wherein the at least one processor, upon execution of the software instructions, is configured to:
receive, over a network from a service provider, a service application package of a service application associated with the service provider that provides a service associated with the service application, wherein the service provider is distinct from a provider of the ATM;
wherein the service comprises at least one of:
a rideshare-related service,
a transportation-related service,
a gaming-related service,
an online media-related service,
a home utility-related service,
a rent-related service,
a medical-related service, or
a medicine-related service:
instruct to install on an operating system of the ATM, the service application using the service application package, the ATM including an application programming interface (API) and one or more peripherals accessible by the service application via the API;
wherein the one or more peripherals including a cash deposit mechanism and at least one location system;
wherein the least one location system comprises at least one of:
data store or
a satellite positioning system component,
wherein the ATM is associated with an entity different from the service entity;
receive credentials for an ATM-associated entity account
receive an account authentication where the credentials match the ATM-associated entity account;
wherein the account authentication enables the API to control the one or more peripherals;
wherein the one or more peripherals are accessed by the user based on the account authentication and without performing a subsequent authentication;
receive an application authentication from the third-party service in response to the account authentication;
provide, on the user interface of the ATM, an indication that the third-party application is available to be accessed on the ATM based on the application authentication;
receive one or more inputs to the service application;
wherein the one or more inputs are based on user selection in the service application;
communicate the one or more inputs to the service;
receive an operation request from the service based on the one or more inputs;
wherein the operation request identifies an operation and is configured to utilize the API to control the one or more peripherals of the ATM using a predefined protocol;
wherein the operation comprises providing a location of the ATM;
accessing, by the service application and via the API, the at least one location system to obtain the location of the ATM;
wherein the API restricts the third-party application from accessing information of a financial account associated with the user during the deposit of cash;
control based on at least one instruction from the service and via the API, the cash deposit mechanism to receive a deposit of cash according to the operation;
sending, to a service system associated with the service, the location information;
receiving, from the service system, a confirmation that a physical service has been dispatched to the location of the ATM; and
displaying, on the user interface of the ATM, the confirmation.

6. The system of claim 5, wherein the satellite positioning system comprises a global positioning system (GPS).

7. The system of claim 5, wherein the at least one processor, upon execution of the software instructions, is further configured to:
enable the third-party application to determine a cash deposit amount of the deposit of cash is less than an amount required;
enable the third-party application to prompt the user to select an account for providing a remaining portion of an amount required in response to the cash deposit amount being less than the amount required; and enable access, by the third-party application, the account selected by the user to obtain the remaining portion of the cash deposit amount.

8. The system of claim 5, wherein the at least one processor, upon execution of the software instructions, is further configured to:

enable the third-party application to receive a receipt in response to the physical service being dispatched; and display, on the user interface of the ATM, the receipt.

* * * * *